G. F. DANIELSON.
WHEEL.
APPLICATION FILED JULY 2, 1913.
1,161,291.
Patented Nov. 23, 1915.
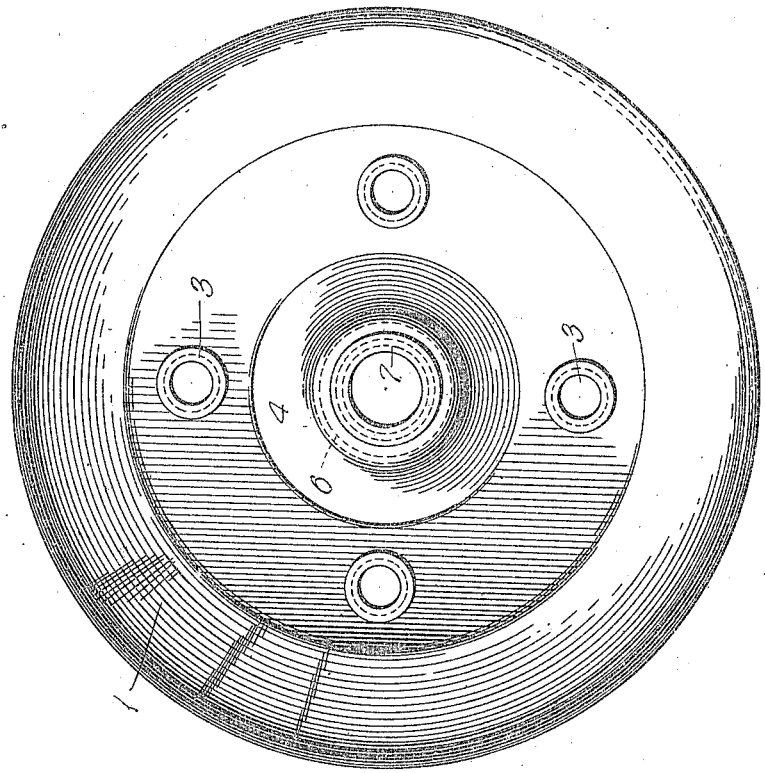
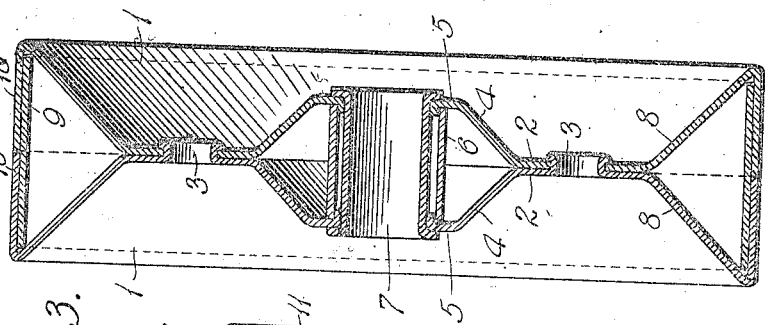
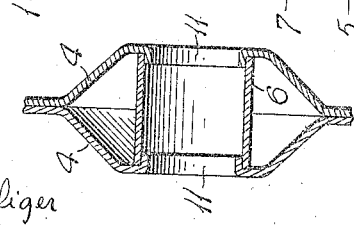
Witnesses
Chas. W. Stauffiger
Anna M. Dorr
Inventor
Gustave F. Danielson,
By
Attorneys

UNITED STATES PATENT OFFICE.

GUSTAVE F. DANIELSON, OF YOUNGSTOWN, OHIO.

WHEEL.

1,161,291.

Specification of Letters Patent.    Patented Nov. 23, 1915.

Application filed July 2, 1913. Serial No. 776,945.

*To all whom it may concern:*

Be it known that I, GUSTAVE F. DANIELSON, a citizen of the United States of America, residing at Youngstown, in the county of Mahoning and State of Ohio, have invented certain new and useful Improvements in Wheels, of which the following is a specification, reference being had therein to the accompanying drawings.

This invention relates to a wheel, pulley, or the like and especially to an arrangement thereof which insures rigidity and lightness together with simplicity of construction.

The invention consists in the matters hereinafter set forth, and more particularly pointed out in the appended claim.

In the drawings, Figure 1, is a view in cross section of a form of wheel that embodies features of the invention. Fig. 2, is a view in side elevation thereof. Fig. 3, is a view in detail of a hub with inner bearing sleeve omitted.

Referring to the drawings, a pair of oppositely disposed, circular sections 1 have annular middle portions 2, which form a wheel web and are secured in abutting relation by tubular rivets 3 struck out of one section and forced through and headed over corresponding apertures in the mating section.

The inner portions of the sections 1 are oppositely inclined as at 4 with inner annular flanges 5, which form the end faces of a hub. A ferrule 6 is retained between the flanges 5 to form a hub body by inbending the margins of the flanges 5 thereover, and a bearing sleeve 7 is inserted and secured by crimping or beading its end portions over the end rolled flanges 5.

A tread is formed by the outbent marginal portions 9 of the sections 1, with inclosed reinforcing ring 9, the parts of the section 1 beyond the reinforcing ring being turned as indicated at 10 into abutting relation concentric with the ring 9. These portions 10 form the tread members of the wheel. If desired, the sleeve 7 may be omitted in which case the inturned margins 11 of the sections 4 (see Fig. 3) act as a bearing.

I claim—

A wheel comprising a pair of circular sections secured together in parallel registration, said sections having annular inner portions oppositely inclined and disposed at obtuse angles relative to said sections and the inner edges of said inner portions inbent to form annular opposing flanges, a ferrule on said flanges between said inner portions and maintaining said flanges in spaced relation, a bearing sleeve supported by said opposing flanges and having the ends thereof flared against said inner portions to bind said inner portions against the ends of said ferrule, and a tread supported by said circular sections.

In testimony whereof I affix my signature in presence of two witnesses.

GUSTAVE F. DANIELSON.

Witnesses:
  OTTO F. BARTHEL,
  ANNA M. DORR.